2,892,806

METHOD OF CURING POLYCHLOROPRENE AT ROOM TEMPERATURE

Clarence D. Moore, Lancaster, Pa., assignor to Armstrong Cork Company, Lancaster, Pa., a corporation of Pennsylvania No Drawing. Application April 25, 1955
Serial No. 503,807

3 Claims. (Cl. 260—41.5)

This invention relates to adhesives, and more particularly to polychloroprene (neoprene) adhesives. Still more particularly it relates to the room temperature curing or vulcanization of polychloroprene adhesives.

In the past, whenever it has been necessary to cure or vulcanize polychloroprene adhesives and coatings at room temperature, it has been the practice to add accelerators, preferably in liquid form, or a combination of accelerators and metallic oxide curing agents immediately before use. The metallic oxides are generally added as ball milled slurries in a solvent and the accelerator is added at the same time. Where the accelerating system is to be used within a short time, it has been the practice to add the accelerator system as a slurry of the metallic oxide curing agents plus the liquid accelerators. This addition of a complete accelerator system, however, can only be done when the accelerating system is to be used within a very short time. Where the system is to be repeatedly used and stored or left standing for a long period of time, the system separates and cakes in the container. For this reason, there has yet to be presented an accelerator system for the room temperature curing of polychloroprene, which system remains stable for periods of time of at least one year and longer.

It is the primary object of the present invention to present such an accelerator system. It is a further object of the present invention to present a unitary accelerator system for curing or vulcanizing a polychloroprene adhesive at room temperature. It is a still further object of the present invention to present a stable two-package polychloroprene-accelerator system for use wherever polychloroprene adhesives and coatings are applied.

To this end, the invention contemplates an accelerator system for room temperature curing of polychloroprene comprising a butadiene polymer, a metallic oxide curing agent for polychloroprene, an accelerator for vulcanizing polychloroprene polymer, and a solvent for said butadiene polymer. These ingredients are present in a ratio of about 100 parts by weight of the butadiene polymer for each 100–1500 parts by weight of the metallic oxide curing agent, and for each 20–300 parts by weight of the accelerator. The solvent for the butadiene polymer should be present in an amount sufficient to dissolve the butadiene polymer.

The usual two-package system of polychloroprene adhesives or coatings comprises one package of unvulcanized polychloroprene and a second package of an accelerator system for the polychloroprene. The present invention relates primarily to this second package. It can be seen that the final product, that is, the cured polychloroprene adhesive or coating, can only be obtained by admixing the two packages. To put it another way, the cured or vulcanized polychloroprene is not obtained until the accelerator system has been admixed with the uncured polychloroprene and sufficient time allowed for the polychloroprene to cure. Generally speaking, the two systems are admixed in a ratio of about 1 to about 6 parts of accelerator system for every 100 parts of the polychloroprene system. The present invention is primarily concerned with the accelerator system.

The first element present in the composition of the present invention is the butadiene polymer. The butadiene polymer may be any of the various polymers of butadiene or the isomers thereof. Additionally, the polymer may be the butadiene-styrene copolymers well known in the art. The ratio of butadiene:styrene in the copolymer is not critical and may vary from about 2:98 to about 97:3 parts, respectively. The precise ratio of the butadiene:styrene present in the copolymer may be chosen with a solvent in mind, since it is one of the conditions of the present invention that the solvent utilized dissolve the butadiene polymer substantially completely. Thus, although the composition of the butadiene-styrene copolymer is not critical, it may be varied to suit a particular solvent.

Another butadiene polymer suitable for use in the present invention is the polymer formed from butadiene-acrylonitrile. Again, the ratio of the two constituents in this copolymer is not critical. However, cost considerations generally render it preferable that the butadiene:acrylonitrile ratio be between about 50:50 to 90:10. Here, too, the precise ratio of the two ingredients may be determined by the solvent desired to be used.

The use of the butadiene polymer in the composition of the present invention brings about unexpected results. The butadiene polymer serves as a stabilizer for the entire accelerator system and yet the polymers are present in such low concentrations after becoming a part of the final adhesive composition that they do not adversely affect the properties of the cured polychloroprene.

The metallic oxide curing agent for polychloroprene polymers are those curing agents well known in the art. Exemplary of these oxide curing agents are zinc oxide, lead oxide, and magnesium oxide bearing the formulas $ZnO$, $PbO$, and $MgO$, respectively. These metallic oxide curing agents are well known in the art and need not further development in the present specification.

The amount of the metallic oxide curing agent may vary widely in the present composition. For every 100 parts by weight of butadiene polymer, the metallic oxide curing agent may be present in an amount of about 100–1500 parts by weight. Where the amount is less than about 100 parts by weight per 100 parts butadiene polymer, there is generally insufficient amount of the curing agent present to achieve a cure of the polychloroprene system at room temperature. On the other hand, where an amount greater than 1500 parts by weight curing agent per 100 parts butadiene polymer is used, the accelerator system again becomes unstable and is likely to cake on long standing. Since it is desirable that as much metallic oxide curing agent as possible be incorporated into the accelerator system, it is preferred that the amount of curing agent be on the high side of the upper limit. Thus, the preferred range of curing agent per 100 parts butadiene polymer is in the range of about 750–1100 parts curing agent per 100 parts by weight butadiene polymer.

The composition of the present invention also includes an accelerator. The accelerator to be used must be a polychloroprene accelerator. In accordance with usual nomenclature, an accelerator as used herein means a material that hastens the cure or vulcanization of polychloroprene. Any of the known accelerators, preferably liquids, for polychloroprene may be utilized in the present invention. Examples of such accelerators are those designated as Accelerator 833, a butyraldehyde plus monobutylamine condensation product; and Accelerator 808, a butyraldehyde plus aniline condensation product. It is preferred that the accelerator to be used in the present composition be a liquid and one whose speed of cure be generally designated at least as "fast," and preferably as "ultra." It should also have no effect on GR-S and Buna N in the absence of added sulfur.

The amount of accelerator to be used will generally vary according to the amount of curing agent to be used, which in turn should be as high as possible as described above Basing the amount of accelerator on the amount of butadiene polymer to be used, the amount of accelerator should be in the range of about 20-300 parts by weight per 100 parts by weight of butadiene polymer. Again, it is preferred that the amount of accelerator be kept as high as possible, consistent with retaining the system in a homogeneous condition. Less than 20 parts accelerator per 100 parts butadiene polymer will not yield a system which gives a cure for polychloroprene at room temperature with sufficient speed. Amounts of accelerator greater than about 300 parts by weight per 100 parts by weight butadiene polymer will not remain homogeneous during extended storage periods.

The solvent to be used in the present composition will vary, depending on the particular butadiene polymer selected. If a butadiene-styrene copolymer is used, then the solvent may be xylol, naphtha, toluol, any of the known hydrocarbon solvents, or mixtures thereof. If a butadiene-acrylonitrile copolymer is used, then the solvent should be methyl ethyl ketone or any other of the known ketone solvents for the butadiene-acrylonitrile copolymers. It is important to point out that the solvent to be used must be a solvent for the butadiene polymer and not necessarily a solvent for the polychloroprene. The amount of solvent to be used will depend on the ability of the particular solvent to dissolve the particular butadiene polymer. Generally speaking, the amount of solvent will vary between about 100-1500 parts by weight per 100 parts by weight butadiene polymer. Once sufficient solvent has been used to dissolve the butadiene polymer, additional solvent merely dilutes the accelerator system and hence reduces its efficiency on a weight basis. To some extent, the amount of solvent to be used will be controlled by the amount of metallic oxide curing agent utilized in the particular system, since the solvent's ability to dissolve the butadiene polymer will be influenced by the amount of curing agent present.

The four components comprising the present accelerator system may be admixed in any convenient manner. The accelerators may be dispersed in the butadiene polymer in an internal type mixer, the curing agent added, and the mass then taken up in the proper solvent to a smooth flowable condition. As described earlier, the butadiene polymer, inert in the system, is used to carry the metallic oxide curing agent in suspension. After a shelf life of over two years, the accelerator system of the present invention shows no settling despite the extraordinarily high loading of the system.

The composition of the polychloroprene package of the two-package adhesive or coating system is not critical, since the above-described accelerator system will cure any of the polychloroprenes. Exemplary of the polychloroprene system is the product designated as Neoprene KNR composed of 100 parts by weight KNR plus 100 parts by weight carbon black in toluol. Although any polychloroprene system can be cured by the accelerator system of the present invention, the KNR system is particularly desirable, since it has a high solids content and a low viscosity.

The accelerator system of the present invention may readily be blended with the polychloroprene by simple stirring. The proper amount, 1 to 6 parts by weight per 100 parts by weight of the polychloroprene system as described above, will rapidly become blended with the polychloroprene system.

The following examples illustrate several embodiments of the present invention. All parts are by weight unless otherwise stated.

*Example I*

Into an internal mixer was placed 200 parts of a butadiene-styrene copolymer to which was added 525 parts Accelerator 833. The mixture was thoroughly blended and there was added 2,000 parts zinc oxide.

When the mixture became homogeneous, 1,800 parts xylol was added and mixing continued until the composition achieved a smooth, flowable condition.

After two years of storage, the composition prepared as described above showed no settling or deterioration of any kind. A mixture of 4 parts by weight of the composition prepared as described above plus 100 parts by weight Neoprene KNR was prepared by stirring the accelerator system into the polychloroprene system. A strong, hard film of polychloroprene was formed at room temperature on standing for 100 hours.

*Example II*

The following accelerator system was prepared as in Example I:

| Ingredients: | Parts |
|---|---|
| Butadiene-styrene copolymer | 200 |
| PbO | 1,500 |
| Accelerator 833 | 525 |
| Xylol | 1,000 |

The above composition showed no break-down after two years of shelf life. A mixture of polychloroprene, 100 parts, plus accelerator system as prepared in this example, 4 parts, cured to a hard film at room temperature in 72 hours.

*Example III*

A mixture of the following ingredients was prepared as in Example I:

| Ingredients: | Parts |
|---|---|
| Butadiene-acrylonitrile copolymer | 200 |
| Zinc oxide | 2,000 |
| Accelerator 833 | 525 |
| Methyl ethyl ketone | 1,800 |

The above composition remained stable after a shelf life of two years and produced curing of polychloroprene when admixed with 100 parts polychloroprene in an amount of 3 parts.

*Example IV*

The following ingredients were admixed according to Example I:

| Ingredients: | Parts |
|---|---|
| Butadiene-acrylonitrile copolymer | 100 |
| Zinc oxide | 1,200 |
| Accelerator 808 | 280 |
| Methyl ethyl ketone | 1,000 |

The above compositions when admixed with 100 parts polychloroprene system to the extent of 4 parts produced a hard polychloroprene film at room temperature in 100 hours.

I claim:

1. The method of curing polychloroprene at room temperature which comprises admixing an accelerator system with polychloroprene in the ratio of about 1-6 parts by weight said accelerator system per 100 parts by weight said polychloroprene system, said accelerator system consisting essentially of (1) a solid butadiene polymer selected from the group consisting of polymerized butadiene, butadiene-styrene copolymers, and butadiene-acrylonitrile copolymers; (2) a metallic oxide curing agent for polychloroprene selected from the group consisting of zinc oxide, lead oxide, and magnesium oxide; (3) an accelerator for vulcanizing polychloroprene selected from the group consisting of the condensation product of butyraldehyde plus monobutylamine, and the condensation product of butyraldehyde plus aniline; and (4) a solvent for said butadiene polymer, said ingredients in said accelerator system being present in a ratio of about 100 parts by weight of butadiene polymer, about 100–1500 parts by weight of curing agent, about 20–300 parts by weight accelerator, and sufficient solvent to dissolve said butadiene polymer.

2. The method according to claim 1 wherein said butadiene polymer comprises a butadiene-styrene copolymer.

3. The method according to claim 1 wherein said butadiene polymer comprises a butadiene-acrylonitrile copolymer.

References Cited in the file of this patent

UNITED STATES PATENTS

| | | |
|---|---|---|
| 2,459,874 | Fay | Jan. 25, 1949 |
| 2,767,152 | Bierman | Oct. 16, 1956 |
| 2,772,249 | Cousins | Nov. 27, 1956 |

OTHER REFERENCES

"The Neoprenes," Du Pont Report, No. 42–3, September 1942, page 6.